United States Patent [19]

Ho

[11] Patent Number: 4,863,371
[45] Date of Patent: Sep. 5, 1989

[54] LOW NO$_x$ HIGH EFFICIENCY COMBUSTION PROCESS

[75] Inventor: Min-Da Ho, Somers, N.Y.

[73] Assignee: Union Carbide Corporation, Danbury, Conn.

[21] Appl. No.: 201,910

[22] Filed: June 3, 1988

[51] Int. Cl.$^4$ ............................................. F23M 3/00
[52] U.S. Cl. ........................................ 431/9; 431/10; 431/187; 431/190
[58] Field of Search ................ 431/8, 9, 10, 174, 175, 431/187, 190; 110/346

[56] References Cited

U.S. PATENT DOCUMENTS

| | | | |
|---|---|---|---|
| 4,297,093 | 10/1981 | Morimoto et al. | 431/10 |
| 4,378,205 | 3/1983 | Anderson | 431/5 |
| 4,408,982 | 10/1983 | Kobayashi et al. | 431/10 |
| 4,541,796 | 9/1985 | Anderson | 431/187 |

OTHER PUBLICATIONS

Bartok et al., "Combustors: Applications And Design Considerations" Chemical Engineering Progress, Mar., 1988, pp. 54–71.

Primary Examiner—Margaret A. Focarino
Attorney, Agent, or Firm—Stanley Ktorides

[57] ABSTRACT

A process to combust fuel and oxidant at high efficiency and with low NO$_x$ generation even when the fuel has non-uniform characteristics and the oxidant is pure oxygen, wherein fuel and oxidant are first combusted within a high velocity oxidant-rich jet, fuel is mixed with combustion products in a recirculation zone and the mixture is aspirated into the oxidant-rich jet and combusted in a diffuse secondary flame at the periphery of the oxidant-rich jet.

13 Claims, 4 Drawing Sheets

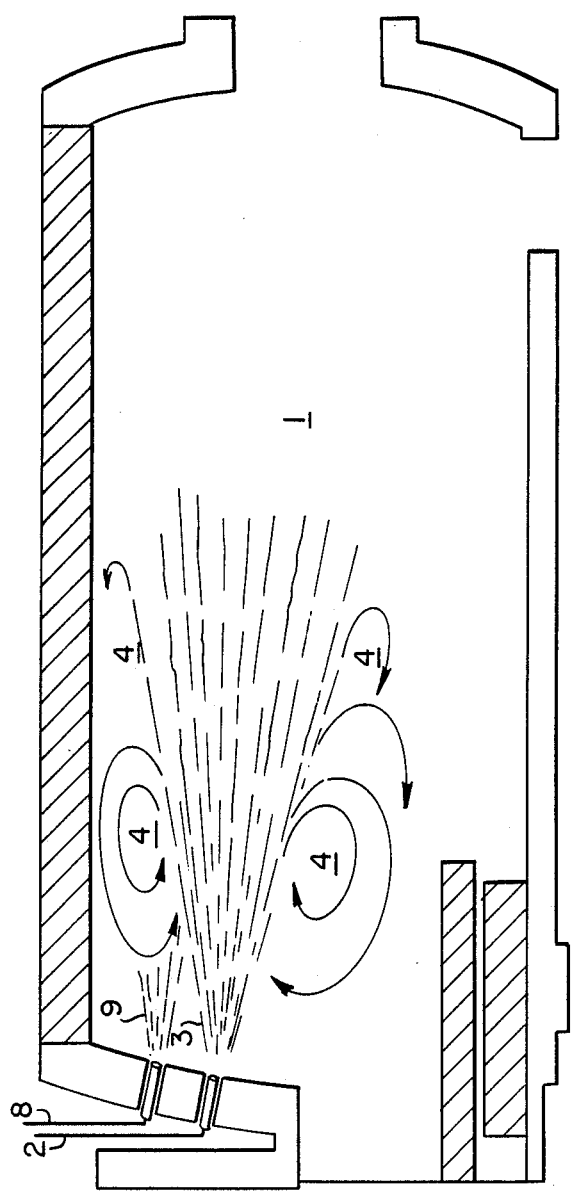

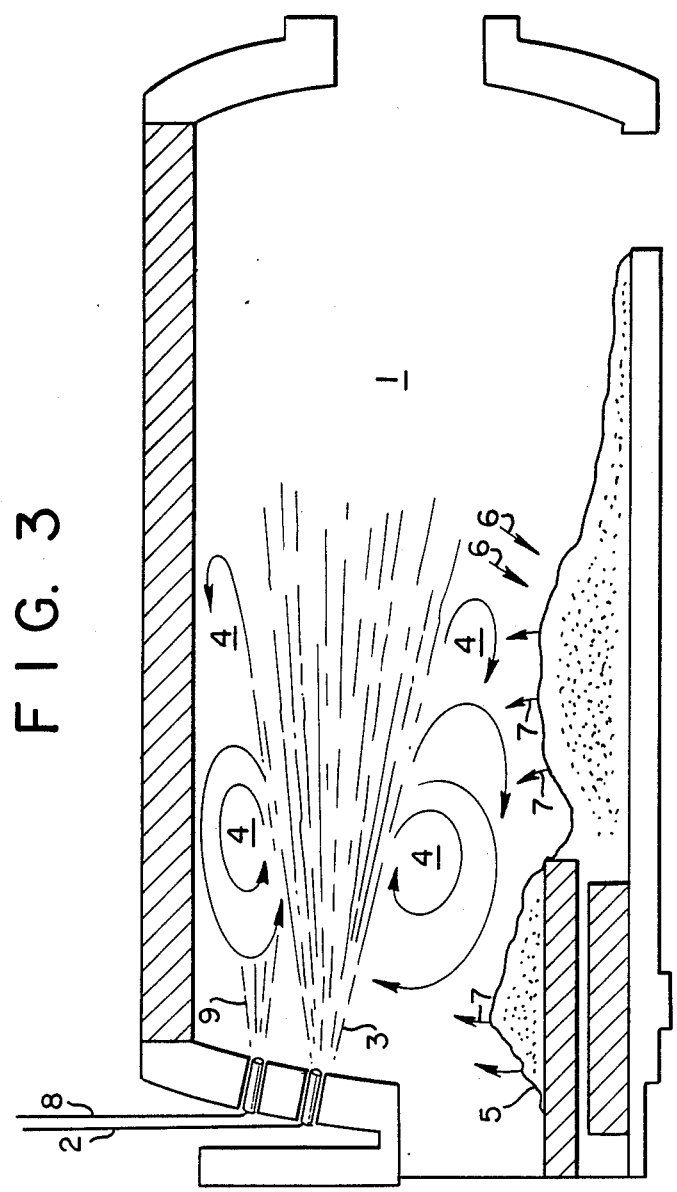

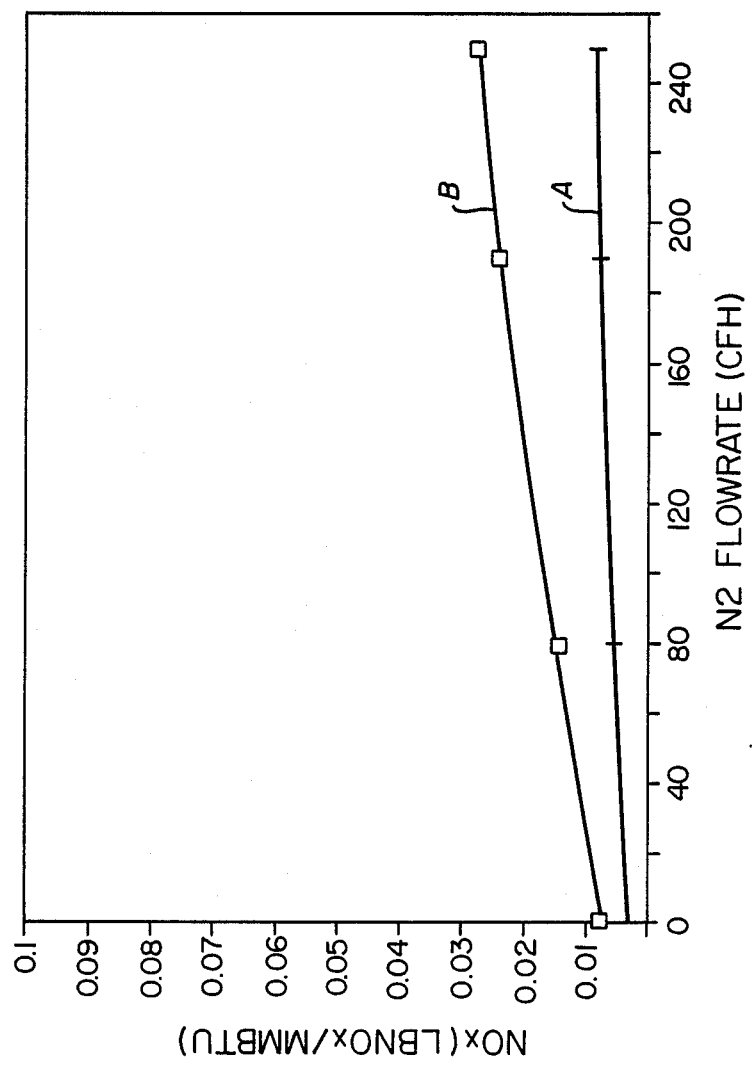

LOW NO$_x$ HIGH EFFICIENCY COMBUSTION PROCESS

TECHNICAL FIELD

This invention relates generally to combustion and more particularly to combustion with oxygen-enriched air or pure oxygen.

BACKGROUND ART

It is desirable to carry out combustion with as high efficiency as possible as this makes the combustion operation more economical while simultaneously reducing the amount of pollutants generated by the combustion process. When the fuel employed in the combustion process has relatively uniform properties and high heating value, efficient combustion may be relatively easily attained by matching the oxygen available for combustion to the stoichiometric oxygen requirement of that fuel. However, when the fuel has a relatively low heat content or a non-uniform and highly variable stoichiometric oxygen requirement it is much more difficult to carry out combustion at high efficiency.

Accordingly, it is an object of the invention to provide a process for combusting fuel and oxidant at high efficiency.

It is a further object of this invention to provide a process for combusting fuel and oxidant at high efficiency even when the fuel has a non-uniform and/or highly variable stoichiometric oxygen requirement.

It is known that the efficiency of a combustion process may be enhanced by the use of pure oxygen or oxygen-enriched air as the oxidant in place of air. Because pure oxygen or oxygen-enriched air contains much less inerts than does air for an equivalent amount of oxygen available for combustion, much less energy is expended pressurizing, pumping and heating these inerts when pure oxygen or oxygen-enriched air is employed as the oxidant. The elimination of this non-productive handling and heating of inerts significantly enhances the efficiency of the combustion process.

The use of pure oxygen or oxygen-enriched air is well known to cause the combustion reaction temperature to increase. The increased temperature favors the kinetics of the combustion reaction toward the formation of nitrogen oxides (NO$_x$). This is undesirable because NO$_x$ is a significant environmental pollutant.

Accordingly, it is another object of this invention to provide a process for combusting fuel and oxidant, particularly pure oxygen or oxygen-enriched air, at high efficiency while also experiencing low NO$_x$ generation.

It is yet another object of this invention to provide a process for combusting fuel and oxidant at high efficiency and with low NO$_x$ generation even when the oxidant is pure oxygen or oxygen-enriched air and when the fuel has a non-uniform and/or highly variable stoichiometric oxygen requirement.

SUMMARY OF THE INVENTION

The above and other objects which will become apparent to one skilled in the art are attained by the present invention which is:

A process for combusting fuel and oxidant at high efficiency with low NO$_x$ generation comprising:

(A) injecting into a combustion zone fuel and oxidant in an oxidant-rich jet at a velocity sufficient to create a reduced pressure and consequently a strong recirculation zone within the combustion zone proximate the oxidant-rich jet;

(B) combusting fuel and oxidant within the oxidant-rich jet to produce combustion products in a jet diluted with oxidant;

(C) introducing fuel into the recirculation zone and mixing fuel and combustion products within the recirculation zone;

(D) aspirating the mixture of fuel and combustion products into the oxidant-rich jet; and (E) combusting the resulting diluted mixture in a diffuse secondary flame at the periphery of the oxidant rich jet to produce further combustion products.

BRIEF DESCRIPTION OF THE DRAWINGS

FIG. 2 is a cross-sectional representation of another embodiment of the invention wherein fuel is injected into the combustion zone and introduced into the recirculation zone.

FIG. 3 is a cross-sectional representation of another embodiment of the invention wherein fuel introduced into the recirculation zone is from fuel volatized within the combustion zone and also from fuel injected into the combustion zone.

FIG. 4 is a graphical representation of experimental results obtained by the practice of the invention and of results obtained by a procedure not in accord with the practice of this invention.

DETAILED DESCRIPTION

Figure 1:
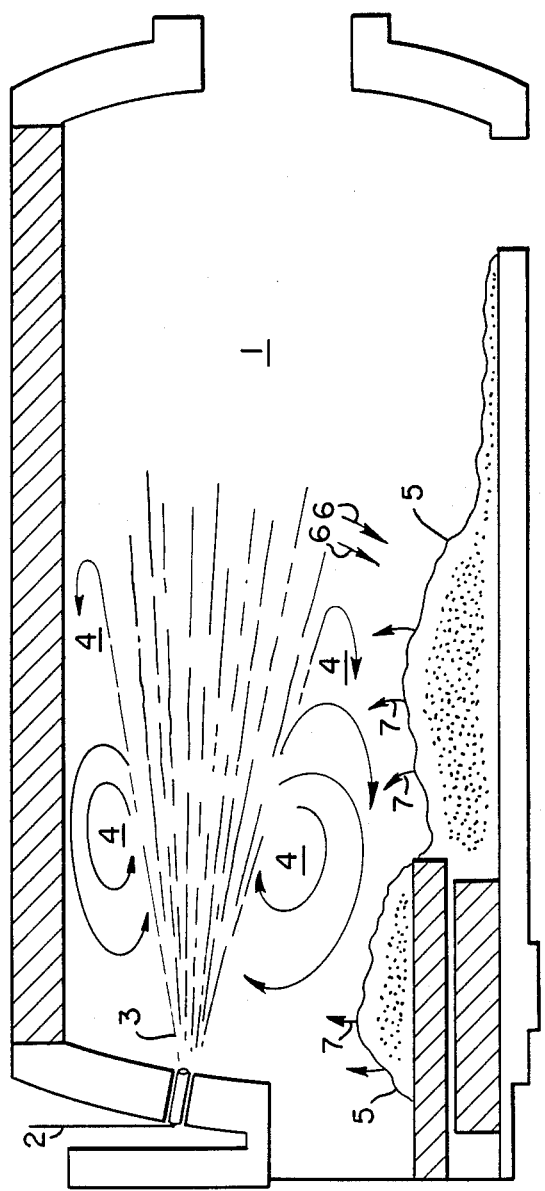
FIG. 1 is a cross-sectional representation of one embodiment of the invention wherein fuel is volatized from liquids and/or solids within the combustion zone and the volatized fuel is introduced into the recirculation zone.

The process of this invention will be described in detail with reference to the Drawings.

Referring now to FIG. 1, combustion zone 1 preferably is substantially confined and closed to the atmosphere. Into combustion zone 1 there is injected fuel and oxidant 2 in an oxidant-rich jet 3. The fuel and oxidant may be injected into combustion zone 1 as a mixture or the fuel and oxidant may be injected separately into combustion zone 1. In the latter case a particularly preferred embodiment comprises a central stream of either fuel or oxidant with the other injected proximate as an annular stream. The fuel and oxidant are ignited by any suitable ignition means (not shown in FIG. 1).

The fuel may be any fluid fuel. Generic examples of suitable fluid fuels include a gas comprised of one or more gaseous components at least one of which is combustible, liquid fuel droplets dispersed in a gaseous medium, and solid fuel droplets dispersed in a gaseous medium. Specific examples of suitable fluid fuels include natural gas, hydrogen, coke oven gas, and propane.

The oxidant may be air, oxygen-enriched air, or pure oxygen. As used herein, "pure oxygen" means an oxidant comprising at least 99.5 volume percent oxygen. Preferably the oxidant comprises at least 30 volume percent oxygen as this enhances the stability of the flame which otherwise may experience instability due to the dilute nature of oxidant-rich jet 3. Most preferably the oxidant is pure oxygen.

As mentioned previously, jet 3 is oxidant-rich. Preferably jet 3 contains oxygen in an amount of at least 300 percent of the stoichiometric amount of oxygen necessary to completely combust the fuel introduced into combustion zone 1 in jet 3. Preferably the oxygen in jet 3 does not exceed 2000 percent of the stoichiometric amount of oxygen necessary for complete combustion as that may create too dilute a jet and would result in an unstable combustion within jet 3.

Jet 3 is injected into combustion zone 1 at a velocity sufficient to create a reduced pressure and consequently a strong recirculation zone within combustion zone 1 proximate the periphery of jet 3. The velocity of jet 3 will vary depending on several factors such as the initial diameter of jet 3 at its point of injection into combustion zone 3, and the configuration of combustion zone 3. Generally, the velocity of jet 3 will be at least 150 feet per second and most often will exceed 250 feet per second.

The fuel and oxidant combust within jet 3 to produce combustion products which include the combustion reaction products of the fuel and oxidant as well as unreacted oxidant. Because of the stoichiometric excess of oxygen and also because of the good mixing inherent in the nature of a jet at the defined velocity, the fuel is caused to react essentially completely. However, because of the dilute nature of jet 3, very little $NO_x$ is caused to form even though pure oxygen may be used as the oxidant. The diluting effects of the stoichiometric excess of oxygen cause the combustion reaction within the jet 3 to be spread out over a larger volume than would otherwise have been the case with stoichiometrically equivalent amounts of fuel and oxygen. This spreading out of the combustion reaction within jet 3 prevents the localized high temperatures which drive combustion reactions toward $NO_x$ formation.

The combustion products from oxidant-rich jet 3 are caused to recirculate back toward the periphery of jet 3 by the pressure gradient between the volume proximate jet 3 and the rest of combustion zone 1. This recirculation back toward the periphery of jet 3 occurs within a recirculation zone illustrated in FIG. 1 as zone 4. Because of the strong nature of the recirculation zone, the mass recirculated back toward the periphery of jet 3 exceeds the mass of jet 3 by up to a factor of 4 to 1 or more.

FIG. 1 illustrates an embodiment of the invention wherein liquids and/or solids 5 which contain volatizable fuel are provided within combustion zone 1. Examples of such liquids and/or solids include waste solvents, waste oil, still bottoms, plastics, and pathological wastes. In this case, combustion zone 1 is generally defined as being within an incinerator or a rotary kiln. These liquids and/or solids are characterized by having a non-uniform and/or highly variable stoichiometric oxygen requirement.

Heat generated by the combustion of fuel and oxidant within jet 3 is passed 6 by convection and/or radiation to material 5 causing fuel to volatize out 7. This fuel is introduced into recirculation zone 4 and therein mixes with combustion products from the previously described combustion. This mixture is then aspirated into jet 3 wherein combustion is continuously occurring. The mixture comprising fuel and oxidant diluted with combustion reaction products is ignited successfully despite the dilution by the ongoing combustion occurring within jet 3 and combusts in a diffuse secondary flame at the periphery of jet 3. Due to the diffusion of the secondary flame, localized high temperatures, which would enhance $NO_x$ formation, are prevented from occurring.

The secondary combustion proceeds and forms further combustion products most of which are caused to recirculate back toward the periphery of jet 3 to serve as further diluents, or which may be passed out of the combustion zone. Even though material 5 has a highly variable stoichiometric oxygen requirement, the mixing within recirculation zone 4 serves to form a more uniform combustible mixture than would be the case if material 5 were burned directly. The increased uniformity, along with the smooth and vigorous aspiration of the mixture into jet 3, allows the operator to more accurately regulate the amount of oxygen injected into combustion zone 1 and thus to carry out the overall combustion process much more efficiently than would otherwise be the case. Furthermore, the combustion rate and efficiency is increased because combustion is not limited to the envelope of combustible vapors released from the material pile 5.

Although the process of this invention has been described with reference to FIG. 1 showing a single oxidant rich jet 3, it will be appreciated by those skilled in the art that a plurality of such jets may be employed.

FIG. 2 illustrates another embodiment of the process of this invention wherein fuel is injected into the combustion zone. The numerals in FIG. 2 correspond to those of FIG. 1 for the common elements and the operation of these common elements will not be described again in detail.

Referring now to FIG. 2, fuel 8 is injected into combustion zone 1 as stream 9 separate from oxidant-rich jet 3. Fuel 8 may be any suitable fuel such as any of the fuels useful in jet 3. In addition fuel 8 may be liquid fuels such as low heating value waste oil or other fuels having a non uniform and/or highly variable stoichiometric oxygen requirement. In the embodiment illustrated in FIG. 2, fuel 8 is injected into combustion zone 1 as stream 9 without any additional oxidant. However, if desired, oxidant may also be injected into combustion zone 1 as part of stream 9 either premixed with fuel 8 or separately proximate to the injection point of fuel 8. When oxidant comprises part of stream 9, the oxygen in the oxidant should not exceed 60 percent of the oxygen necessary for complete combustion of fuel 8.

Stream 9 is introduced into recirculation zone 4 and therein mixes with combustion products. This mixture is then aspirated into jet 3 wherein combustion is continuously occurring. The mixture comprising fuel and oxidant diluted with combustion reaction products is ignited successfully despite the dilution by the ongoing combustion occurring within jet 3 and combusts in a diffuse secondary flame at the periphery of jet 3. Due to the diffusion of the secondary flame, localized high temperatures, which would enhance $NO_x$ formation, are prevented from occurring.

The secondary combustion proceeds and forms further combustion products which may then serve as further diluents or may be passed out of the combustion zone. Even though stream 9 may have a highly variable stoichiometric oxygen requirement, the mixing within recirculation zone 4 serves to form a more uniform combustible mixture than would be the case if stream 9 were burned directly. This increased uniformity, along with the smooth aspiration of the mixture into jet 3, allows the operator to more accurately regulate the amount of oxygen injected into combustion zone 1 and thus to carry out the overall combustion process much more efficiently than would otherwise be the case.

Although the process of the invention has been described with reference to FIG. 2 showing a single fuel stream 9, it will be appreciated by those skilled in the art that a plurality of such streams may be employed.

FIG. 3 illustrates a third embodiment of the process of this invention wherein fuel, which is introduced into the recirculation zone, is taken both from fuel volatized from liquid and/or solid material within the combustion zone, and from fuel injected into the combustion zone as a stream separate from the oxidant-rich jet. The numerals in FIG. 3 correspond to those of FIGS. 1 and 2 and the process steps will not be again described in detail since they were described with reference to FIGS. 1 and 2.

The following serve to further illustrate the process of the invention or to compare the results obtained by the invention with results obtained by a procedure not in accord with the practice of this invention. The example is provided for illustrative purposes and are not intended to be limiting.

EXAMPLE

The process of this invention was carried out with a furnace system similar to that shown in FIG. 2. The fuel was natural gas, the oxidant was pure oxygen, the furnace temperature was maintained at about 2050° F., and the furnace was operated at a heat output of about 1.0 million BTU per hour. The furnace was refractory-lined and water cooled by ten 1.5 inch diameter pipes at the furnace bottom, and had inside dimensions of 3 feet by 4 feet by 8 feet.

The fuel was introduced into the combustion zone as jet 9 about 6 inches away from where oxidant-rich jet 3 was injected. As a result, the fuel in jet 9 passed into the recirculation zone where it mixed with combustion products prior to aspiration of the resulting mixture into the oxidant-rich jet. $NO_x$ measurements were taken of the flue gases at various nitrogen flowrates which reflect various rates of air leakage into the furnace. The results are shown as Curve A in FIG. 4.

For comparative purposes the procedure was repeated except that the fuel jet was only about 2.8 inches from the oxidant-rich jet thus causing the staged fuel to pass into the oxidant-rich jet directly without passage into the recirculation zone as in the process of this invention. The $NO_x$ measurements for this comparative procedure are shown as Curve B in FIG. 4.

As is clearly seen by the results plotted in FIG. 4, the process of this invention enables a significant $NO_x$ reduction over that obtainable by a procedure not in accord with the practice of this invention; generally to a level of only about one-third of the $NO_x$ generated.

Although the method of this invention has been described in detail with reference to certain specific embodiments, those skilled in the art will recognize that there are other embodiments of this invention within the spirit and scope of the claims.

I claim:

1. A process for combusting fuel and oxidant at high efficiency with low $NO_x$ generation comprising:
    (A) injecting into a combustion zone fuel and oxidant in an oxidant-rich jet at a velocity sufficient to create a reduced pressure and consequently a strong recirculation zone within the combustion zone proximate the oxidant-rich jet;
    (B) combusting fuel and oxidant within the oxidant-rich jet to produce combustion products in a jet diluted with oxidant;
    (C) introducing fuel into the recirculation zone and mixing fuel and combustion products within the recirculation zone;
    (D) aspirating the mixture of fuel and combustion products into the oxidant rich jet; and
    (E) combusting the resulting diluted mixture in a diffuse secondary flame at the periphery of the oxidant-rich jet to produce further combustion products.

2. The process of claim 1 wherein the oxidant comprises at least 30 volume percent oxygen.

3. The process of claim 1 wherein the oxidant is pure oxygen.

4. The process of claim 1 wherein the oxidant-rich jet contains oxygen in an amount within the range of from 300 to 2000 percent of the stoichiometric amount of oxygen necessary to completely combust the fuel in the oxidant-rich jet.

5. The process of claim 1 wherein the velocity of the oxidant-rich jet is at least 150 feet per second.

6. The process of claim 1 wherein the fuel and oxidant are injected into the combustion zone as a mixture.

7. The process of claim 1 wherein the fuel and oxidant are injected into the combustion zone separately.

8. The process of claim 7 wherein one of the fuel and oxidant is injected into the combustion zone as a central stream and the other of the fuel and oxidant is injected into the combustion zone as an annular stream around the central stream.

9. The process of claim 1 wherein the fuel introduced into the recirculation zone is fuel volatized from liquid and/or solid material within the combustion zone.

10. The process of claim 1 wherein the fuel introduced into the recirculation zone is fuel introduced into the combustion zone as a stream separate from the oxidant rich jet.

11. The process of claim 10 wherein said stream additionally contains oxygen in an amount up to 60 percent of the oxygen necessary to completely combust the fuel within said stream.

12. The process of claim 1 wherein the fuel introduced into the recirculation zone is both fuel volatized from liquid and/or solid material within the combustion zone and fuel introduced into the combustion zone as a stream separate from the oxidant-rich jet.

13. The process of claim 1 wherein the mass of the fuel and combustion products within the recirculation zone exceeds the mass of the oxidant-rich jet by a factor of at least 4 to 1.

* * * * *